Patented May 12, 1953

2,638,433

UNITED STATES PATENT OFFICE 2,638,433

PHARMACEUTICAL PREPARATION FOR PEPTIC ULCERS

James T. George, Los Angeles, Calif.

No Drawing. Application November 17, 1949,
Serial No. 128,010

2 Claims. (Cl. 167—55)

This invention relates to preparations adapted for use in treating disorders of the gastro-intestinal tract, more particularly to include preparations containing proteins and protein derivatives for the treatment of ulcerated conditions of the stomach and intestines.

Efforts have been made in the past to protect against intestinal disorders which are usually accompanied by a hyper-acid condition by artificially increasing the anti-acid properties of the mucus present in the stomach and the other digestive organs. This has been accomplished by various methods such as the preparation of aluminum mono-glycinate and other compounds contining basic or semi-basic salts of aluminum calcium and magnesium.

Lipschitz in U. S. Patent 2,362,386 prepared an anti-acid composition comprising a mixture of calcium carbonate and calcium caseinate. Kranz in U. S. Patent 2,480,743 has a method of preparing aluminum mono-glycinate which is used to treat excessive acidity. Thompkins in U. S. Patent 2,139,139 prepares a mixture of pectin, and reducing sugars for the treatment of certain infantile gastric disorders.

The objections usually raised to the use of the materials containing proteins and to protein-derivatives are that the product is very difficult to maintain under a standard degree of purity and it is usually objectionable to the patient because of its strong and disagreeable taste.

It is an object of the present invention to produce a composition having a high protein content, that is free from a disagreeable taste and at the same time will have a beneficial effect on the ulcer and ulcerated condition found in the gastro-intestinal tract, usually in the stomach or in the opening into the intestine.

Another object of the present invention is to supply at least 10% of the daily requirement of 2500 calories in the form of protein and fat and carry with it the necessary vitamin and vitamin-like material and at the same time to have a product that is palatable and will have a curative effect on the ulcerated conditions.

It has been found that the composition made from a cottonseed flour derivative containing dextrose, magnesium - tri - silicate and calcium carbonate will supply the necessary food value and will have the desired effect on the ulcerated conditions. An example of this composition is:

| | Per cent |
|---|---|
| Cotton seed flour derivative | 50 |
| Dextrose | 40 |
| Magnesium tri silicate | 05 |
| Calcium carbonate | 05 |

The cotton seed flour derivative referred to contains a large percentage of protein and a comparatively small amount of fat. Such a product is sold under the trade name of Proflo and is sold by The Traders Oil Mill Company, Fort Worth, Texas. This material contains:

| | Per cent |
|---|---|
| Protein | 57 |
| Fat | 6.5 |
| Carbohydrate | 21.4 | as well as an amount of moisture, crude fibre, etc. In addition to these valuable food products this material contains the following amount of vitamins and vitamin-like material in micrograms per gram of flour:

| | |
|---|---|
| Thiamin | 10.4 |
| Riboflavin | 10.2 |
| Niacin | 84 |
| Pantothenic acid | 25.5 |

This material is made from cottonseed by removing a large percentage of the oil and certain other products that render the material unpalatable. It is possible to get a continuous supply of the standardized product from the manufacturers. This is not true of the casein derivatives and other protein compositions which vary so drastically in taste and composition.

Dextrose is added to the cottonseed flour. This sugar has a smoothing effect on the vagus nerve, so that it does not overstimulate the gastric glands. Furthermore, dextrose has a tendency to assist the gastro-intestinal tract to synthesize its own vitamin B complex.

Magnesium tri silicate and calcium carbonate are added in very small amounts to neutralize the excess amount of hydrochloric acid which irritates the intestinal ulcers. Either calcium carbonate or magnesium tri silicate may be used alone, but the preferred composition is the one given above, where a small amount of each is used. Magnesium tri silicate is also used for its mild laxative action. My composition is administered in doses equivalent to the usual amounts of the anti-acids.

The proportions of the ingredients of my composition may be varied to a considerable extent to meet individual requirement, but the basic composition comprises essentially cottonseed flour and anti-acid material in very small amounts and a soothing glucose, if desired.

What is claimed is:

1. A pharmaceutical preparation for the treatment of peptic ulcers comprising a mixture of about 50% by weight of flour derived from cotton seed, containing not more than 6.5% fat, about 40% dextrose and about 5% magnesium trisilicate and about 5% calcium carbonate.

2. A pharmaceutical preparation which is characterized by anti-acid properties and high protein, fat and vitamin content, said preparation comprising a flour derived from cottonseed containing not more than 6.5% fat, dextrose, magnesium trisilicate and calcium carbonate.

JAMES T. GEORGE.

References Cited in the file of this patent

UNITED STATES PATENTS

| Number | Name | Date |
|---|---|---|
| 2,061,184 | Camp | Nov. 17, 1936 |
| 2,095,259 | Kober | Oct. 12, 1937 |
| 2,394,107 | Roseman | Feb. 5, 1946 |

OTHER REFERENCES

Gutman, Modern Drug Encyclopedia, 4th edition, January 1949, page 153.

Zucker, Industrial and Engineering Chemistry, Industrial Edition, volume 35, pages 868 to 872 (August 1943).

U. S. Dispensatory, 24th edition (1947), pages 353, 354.